United States Patent [19]

Deininger et al.

[11] 3,875,073

[45] Apr. 1, 1975

[54] MOISTURE-STABILIZED EFFERVESCENT MIXTURE

[75] Inventors: Rolf Deininger; Erich Wolf, both of Koln, Germany

[73] Assignee: Hermes Sweeteners Ltd., Zurich, Switzerland

[22] Filed: Mar. 30, 1972

[21] Appl. No.: 239,661

[30] Foreign Application Priority Data
June 15, 1971 Germany.......................... 2129570

[52] U.S. Cl............ 252/188.3 R, 252/372, 424/44, 426/191
[51] Int. Cl...................... A23l 1/00, A61k 11/02
[58] Field of Search........ 252/188.3 R, 372; 424/44; 99/78, 79; 426/191

[56] References Cited

UNITED STATES PATENTS

| | | | |
|---|---|---|---|
| 2,463,962 | 3/1949 | Gorcica et al. | 252/188.3 R |
| 3,518,345 | 6/1970 | Dines et al. | 424/44 |
| 3,556,803 | 1/1971 | Ehrreich et al. | 252/188.3 R |

Primary Examiner—Benjamin R. Padgett
Assistant Examiner—Irwin Gluck
Attorney, Agent, or Firm—Eric H. Waters

[57] ABSTRACT

In order to inhibit the moisture sensitivity of an effervescent mixture of an acid and a compound which releases a gaseous substance when subjected to the influence of the acid in gaseous solution, there is added to the mixture 0.5 to 2 percent of a water-soluble swellable natural albumin such as whey albumin, casein or soya bean albumin.

3 Claims, 1 Drawing Figure

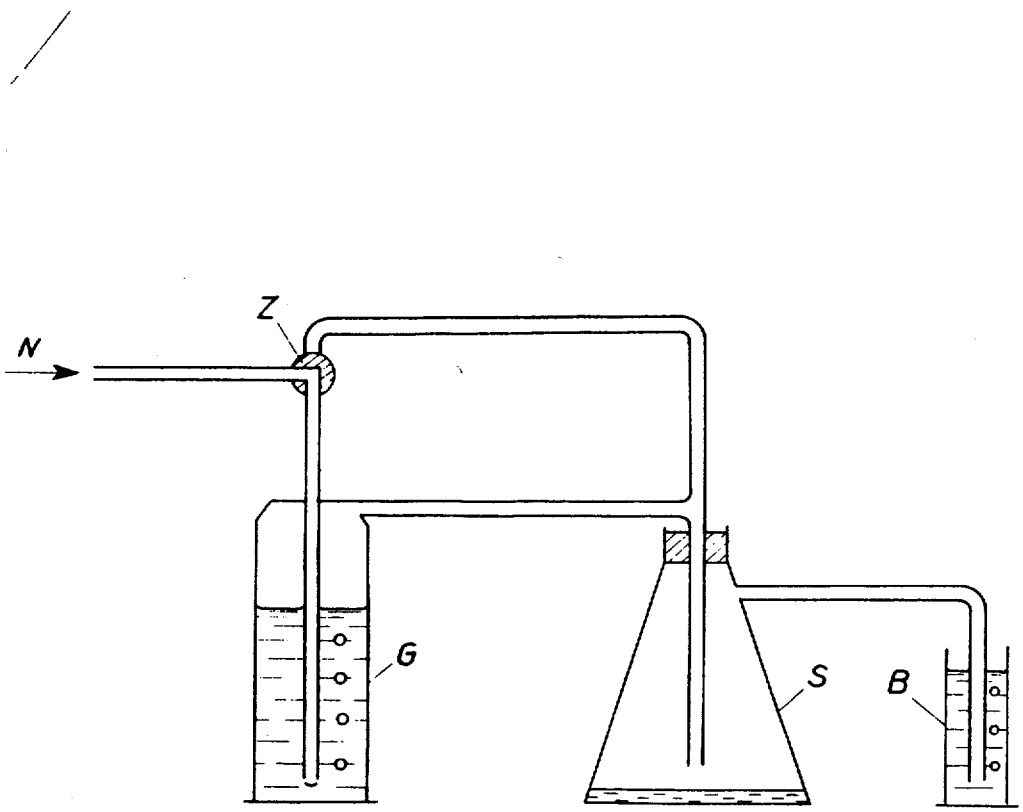

MOISTURE-STABILIZED EFFERVESCENT MIXTURE

BACKGROUND OF THE INVENTION a. Field of the Invention:

The invention relates to effervescent mixtures which are stabilized or protected from the influence of moisture or humidity.

b. Prior Art:

Effervescent mixtures are widely known and in common use. They consist of an acid and of a compound which releases a gaseous substance when subjected to the influence of this acid in the presence of water, wherein the released gaseous substance bubbles through the aqueous solution and creates foam. Using an effervescent mixture, it is possible to expedite the dissolution or the fine dispersion of a substance in an aqueous medium. In many cases, for instance in pills to be dissolved in water, it is desirable to achieve a quick and complete dissolution in order to enhance the absorbability and, consequently, the effectiveness of the drug. Thus, medicinal substances have been introduced in an increasing variety having the form of effervescent pills or powders.

The most commonly known application of effervescent mixtures is apparently in the field of production of beverages. The conventional effervescent mixture for preparation of flavored soda water, which is produced in the form of a powder or of a pill, is a combination of an effervescent mixture with aromatic substances and sugar or an artificial sweetener. In this case, the effervescent mixture not only serves the purpose of dissolving or finely dispersing the ingredients of the beverage, but, simultaneously, it gives the beverage a refreshing, bubbling character derived from the presence of the released carboxylic acid.

The use of the acidic and the gas-releasing components is restricted in effervescent mixtures designated for human consumption by the laws of various countries. Acids accepted for human consumption are citric acid, tartaric acid, acetic acid and lactic (hydroxypropionic) acid, from which the solid fruit acids, i.e. the citric acid and the tartaric acid, are preferred.

Alkaline bicarbonates, preferably sodium bicarbonate, are most commonly used as gas-releasing components.

These conventional effervescent mixtures are greatly disadvantageous in that they are extremely sensitive to the influence of moisture or humidity. As a matter of fact, the reaction of acidic components with the components releasing carbon dioxide already commences under the influence of moisture in the air and, as a result, the mixture loses a considerable part of its effectiveness and develops a crust. This undesirable premature reaction of both components of the mixture develops more quickly, the more finely divided the components, as reaction speed increases with increase of the surface area of the components. However, it is desirable to manufacture finely divided effervescent mixtures, as the solubility of such mixtures is greater than of those having coarse grains.

The moisture sensitivity of the effervescent mixtures causes a considerable expenditure in the production process and during the storage of the mixtures. Consequently, the entire manufacture and packaging operations must be conducted in rooms whose relative humidity does not exceed 40 percent. Also storage is difficult. A desiccator cartridge must be provided in the storage container in order to prevent moisture from entering the container, particularly during the filling or emptying operations.

The difficulties encountered are even greater in the case of production of medicinal substances in form of an effervescent pill. Herein, not only must the production of the effervescent mixture be conducted under conditions where the moisture content of the air is substantially reduced, preferably in air-conditioned rooms, but also all subsequent steps up to the production of the pills.

The problem of stabilization or protection of the effervescent mixtures from the influence of moisture or humidity has not been satisfactorily solved up to the present time. Only foot bath effervescent pills are currently manufactured with comparatively large amounts (between 10 and 20 percent) of sodium sulfate or starch added to the mixture. A sort of "attenuation effect" is intended to be achieved by this addition for the effervescent mixture, by which the possibility of a reaction between both components, i.e. the acid and the bicarbonate, is reduced. With increasing amount of the attenuation substance, the probability is reduced that an acidic and a bicarbonate crystal are located in immediate proximity of each other. It is evident from the above that an effective attenuation necessitates use of a large amount of attenuating additive substance. A disadvantage of the use of such large amounts of additive substances is that they distort the character of the effervescent mixture, which is of considerable importance for effervescent mixtures which are designated for human consumption. Furthermore, the dissolving capability of the effervescent mixture is impaired by the high attenuation. In order to achieve the same solubility, a larger amount of effervescent mixture must be used.

Consequently, it would be desirable to stabilize or protect the effervescent mixture from the influence of moisture or humidity by a minute addition of a substance which does not change the character of the effervescent mixture.

SUMMARY OF THE INVENTION

It has been discovered that conventional effervescent mixtures are very efficiently stabilized or protected from the influence of moisture or humidity by the addition of a small amount of albumin. The addition of albumin has such an effect that the effervescent mixture can be manufactured, processed and packaged without special precautions, and without running any risk that the mixture will develop an undesirable crust as a result of a premature reaction of the components.

Consequently, an object of the present invention is to produce an effervescent mixture composed on an acid, preferably an acid acceptable for human consumption, and a compound which releases a gaseous substance when subjected to the influence of this acid, which is characterized by the addition of a natural water-soluble or swellable albumin.

Surprisingly, even with a very small amount of albumin, amounting to 0.5 percent of the mixture, good stabilization is achieved. The amount of albumin addition is practically unlimited in the upward direction; however, high concentrations retard the dissolution to some extent. Moreover, the solution becomes increasingly opaque if concentrations are used higher than approximately 2 percent of albumin in the mixture, as a result of dissolving relations of the albumin. Therefore, in practice, additions in the range of approximately 0.5 to 2 percent are used, and an amount of 1 percent is preferred.

The solid acids, i.e. citric acid, tartaric acid and lactic (hydroxypropionic) acid are preferably used as acids for effervescent mixtures which are designated for human consumption. However, acids can be used for mixtures which are not intended for human consumption, which are not explicitly allowed according to food Laws, as, for instance, fruit acids, such as hydroxysuccinic (malic) acid and glutamic acid.

Sodium bicarbonate, potassium bicarbonate or mixtures of these two alkali bicarbonates are used as gas-releasing components.

All dry swellable proteins are suitable for use as the albumin in this mixture. However, (lactic) albumin, milk (lactic) albumin with low contents of milk (lactic) sugar, whey albumin, casein and soya bean albumin have proved to be particularly advantageous.

The mixing process is not critical. The albumin can be admixed with the finished mixture as well as with any of the two constituents. However, the albumin is preferably pre-admixed with one constituent of the effervescent mixture, before the other constituent is added.

The effervescent mixture according to the present invention may contain flavoring agents, such as fruit flavors, minerals salts or pharmaceutical agents, in accordance with its intended use.

BRIEF DESCRIPTION OF THE DRAWING

The sole FIGURE of the drawing diagrammatically illustrates a test apparatus according to the invention.

DESCRIPTION OF PREFERRED EMBODIMENTS

EXAMPLE 1:

10 kg of a conventional effervescent mixture consisting of 11 parts of tartaric acid and 5 parts of sodium bicarbonate is mixed in a gas-proof sealed resilient container of 110 liters for 15 minutes on a gyro-wheel mixer, the relative humidity of the ambient air being 60 percent. A very high pressure develops in the container as a result of release of $CO_2$ from the effervescent mixture, which becomes evident by inflation of the container.

1 percent of various kinds of albumin, are added to the same effervescent mixture and mixed under similar conditions. The various albumins being milk (lactic) albumin, whey albumin, casein and soya beam albumin. No increased pressure is observed in the container.

EXAMPLE 2:

In a series of experiments, effervescent mixtures consisting of ingredients allowed by the food laws (milk (lactic) acid, citric acid, tartaric acid and sodium and-/or potassium bicarbonate) are supplemented with 1 percent of the albumins mentioned in Example 1. The resistance to water vapor is taken as a measure of the moisture stabilizing effect of the albumins on the mixtures. The resistance to water vapor is measured in an apparatus shown in the sole FIGURE of the attached drawing, wherein G is a gas flask filled with water, S is a container filled with the effervescent mixture to be examined and B is a container with baryta water. A continuous flow of nitrogen (cca 50 ml) is supplied from a nitrogen flask (not shown) through the gas washing flask G filled with water, and the nitrogen flow saturated with water vapor is then blown onto the effervescent mixture to be examined. After one minute, a two-way valve Z is reversed and dry nitrogen is blown directly into the container S and thoroughly cleanses the same. The released $CO_2$ can be made visible in the subsequent container B as a precipitation of $BaCO_3$.

As a result of the above test, substantially no $CO_2$ release could be measured in all examined effervescent mixtures after exposure for one minute to the nitrogen saturated with water vapor.

In comparison, tests with effervescent mixtures without the stabilizing addition of the albumin showed after 10 to 20 seconds, development of $CO_2$ observed by the precipitation of $BaCO_3$ from the baryta lye.

EXAMPLE 3:

This Example illustrates the stabilizing effect of albumin as a function of concentration. As in the Example 2, nitrogen saturated with water vapor is fed to the test mixture for such a period of time until $CO_2$ production can be determined.

For a mixture of 2 g citric acid and 1 g potassium bicarbonate after 10 seconds of exposure, production of $CO_2$ is seen in the baryta lye.

By addition of 0.5 percent of the albumin substances as mentioned in Example 1, recognizable production of $CO_2$ occurs after approximately 40 seconds.

The addition of 1 percent albumin brings the retardation effect to slightly more than 50 seconds. Consequently, the production of $CO_2$ can be observed only after approximately 60 seconds.

Further increases in the amount of albumin cause slow increases in the retardation or inhibition effect.

EXAMPLE 4:

The following substances were examined in concentrations of 1 percent in the same manner as in Example 1 with respect to their moisture or humidity retardation or inhibition effect:

Gelatin, pulverized; Fa. E. Merck, Art. No. 4078
Starch, water-soluble; Fa. E. Merck, Art. No. 1253
Rice starch; commercial quality
Sodium sulphate; anhydrous
Sodium alginate; LF 250 of the Fa. Protanal, Norway
None of the tested substances shows any stabilizing property.

What is claimed is:

1. A method of inhibiting the moisture sensitivity of an effervescent mixture consisting of an acid and a compound which releases a gaseous substance when subjected to the influence of the acid in aqueous solution, said acid being selected from the group consisting of citric, tartaric, acetic, hydroxysuccinic and glutamic acids, said gas-releasing compound being an alkali bicarbonate, the amount of acid to alkali bicarbonate being in the ratio of about 10–11 parts by weight to 5 parts by weight, said method consisting of adding in admixture to said mixture a substance consisting of a water-soluble, swellable natural albumin in an amount between about 0.5 and 2 percent of the mixture.

2. A method as claimed in claim 1, wherein said alkali bicarbonate is selected from the group consisting of sodium bicarbonate, potassium bicarbonate and mixtures thereof.

3. A method as claimed in claim 1 wherein said albumin is selected from the group consisting of lactic albumin, casein and soya bean albumin.

* * * * *